(12) United States Patent
Bradley

(10) Patent No.: US 9,114,434 B2
(45) Date of Patent: Aug. 25, 2015

(54) APPARATUS AND METHOD FOR INSPECTING AND SORTING PIECE PARTS

(71) Applicant: EBAA Iron, Inc., Eastland, TX (US)

(72) Inventor: Earl Terence Bradley, Eastland, TX (US)

(73) Assignee: EBAA IRON, INC., Eastland, TX (US)

(*) Notice: Subject to any disclaimer, the term of this patent is extended or adjusted under 35 U.S.C. 154(b) by 32 days.

(21) Appl. No.: 14/154,896

(22) Filed: Jan. 14, 2014

(65) Prior Publication Data
US 2015/0196935 A1 Jul. 16, 2015

(51) Int. Cl.
*B07C 5/12* (2006.01)
*B07C 5/08* (2006.01)
*B07C 5/04* (2006.01)
*G01B 11/02* (2006.01)
*G01B 7/02* (2006.01)

(52) U.S. Cl.
CPC ... *B07C 5/12* (2013.01); *B07C 5/04* (2013.01); *B07C 5/08* (2013.01); *G01B 7/023* (2013.01); *G01B 11/026* (2013.01)

(58) Field of Classification Search
CPC .............. B07C 5/00; B07C 5/04; B07C 5/08; G01B 7/023; G01B 11/026
USPC .......... 209/604, 619, 688, 586, 587, 601, 656
See application file for complete search history.

(56) References Cited

U.S. PATENT DOCUMENTS

| 3,731,795 | A | * | 5/1973 | Velthoven | 209/619 |
|---|---|---|---|---|---|
| 4,785,941 | A | * | 11/1988 | Mori | 209/601 |
| 4,998,987 | A | * | 3/1991 | Jacobs | 209/552 |
| 5,088,239 | A | * | 2/1992 | Osman | 451/5 |
| 5,157,847 | A | * | 10/1992 | Perks | 33/836 |

* cited by examiner

*Primary Examiner* — David H Bollinger
(74) *Attorney, Agent, or Firm* — Haynes and Boone, LLP

(57) ABSTRACT

An apparatus and method according to which a piece part is inspected and sorted. In several exemplary embodiments, the piece part is a post-tension concrete anchor. In an exemplary embodiment, the apparatus includes a reference component configured to engage the piece part by extending within an opening defined the piece part. The reference component extends within the opening by a first distance, the first distance being based on at least one dimension defined by the opening. A depth measurement device is configured to measure a second distance, which is a function of the first distance. A controller is configured to determine whether the second distance is within a predetermined range. If not, a bracket disengages the piece part from the reference component at a first location. If the second distance is within the predetermined range, the bracket disengages the piece part from the reference component at a second location.

21 Claims, 10 Drawing Sheets

APPARATUS AND METHOD FOR INSPECTING AND SORTING PIECE PARTS

BACKGROUND

This disclosure relates in general to an apparatus and method for inspecting and sorting piece parts. In several exemplary embodiments, the piece parts are post-tension concrete anchors.

DETAILED DESCRIPTION

Figure 1:
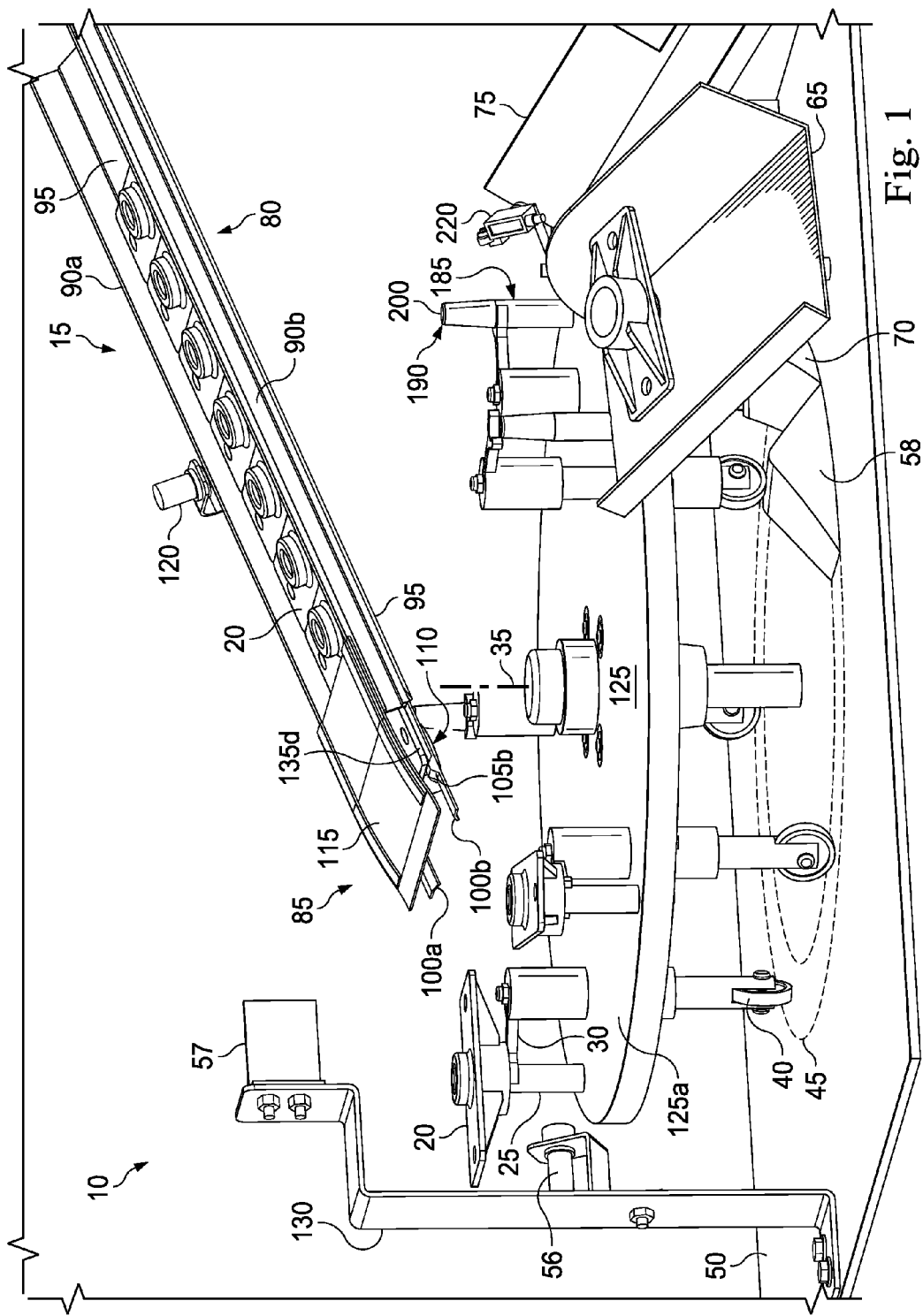
FIG. 1 is a perspective view of an apparatus according to an exemplary embodiment, the apparatus including a plurality of piece parts, a movable cam, a fixed cam, a displacement bracket, and a reference component.

In an exemplary embodiment, as illustrated in FIG. 1, an apparatus is generally referred to by the reference numeral 10 and includes a ramp 15 that receives a piece part, such as a post-tension concrete anchor 20, at one end and discharges the anchor 20 at the opposing end. The apparatus 10 also includes at least one reference component, such as at least one pin 25, which is configured to engage the anchor 20 located on the ramp 15. The pin 25 is proximate a bracket 30. The pin 25 moves below the ramp 15 and about an axis 35. The bracket 30 is coupled to a caster 40 that travels along a circular path 45 on a horizontal surface 50. The apparatus 10 also includes a controller 55 (shown in FIG. 6) in communication with each of a proximity sensor 56, a depth measurement device 57, and a movable cam 58, so that when the proximity sensor 56 senses the presence of the pin 25, the controller 55 activates the depth measurement device 57 to measure a distance between the depth measurement device 57 and the anchor 20. The controller 55 then actuates an actuator 60 (shown in FIG. 8A) to displace the movable cam 58 if the distance is not within a predetermined range of acceptable distances, thereby disengaging the anchor 20 from the pin 25 so that the anchor 20 falls into a chute 65. The apparatus 10 also includes a fixed cam 70 to disengage the anchor 20 from the pin 25 when the distance is within the predetermined range of acceptable distances so that the pin 25 falls into a chute 75.

The ramp 15 includes a receiving portion 80 at one end and a discharge portion 85 at the opposing end. The ramp 15 is mounted at an angle, relative to the ground or the horizontal surface 50, so that the receiving portion 80 is located above the discharge portion 85. In an exemplary embodiment, the ramp 15 is mounted relative to the horizontal surface 50 at an angle between 30 degrees and 60 degrees. The ramp 15 includes walls 90a and 90b spaced in a generally parallel relation. An angled bottom 95 is connected to respective bottom portions of the walls 90a and 90b. The angled bottom 95 is configured to accommodate the anchor 20. The discharge portion 85 includes arms 100a and 100b extending from the respective bottom portions of the walls 90a and 90b. The discharge portion 85 also includes protrusions 105a (shown in FIG. 3) and 105b (shown in FIGS. 1 and 5), which are located on the arms 100a and 100b, respectively. The protrusions 105a and 105b prevent the anchor 20 from sliding off the ramp 15 due to gravity. In an exemplary embodiment, the protrusions 105a and 105b are tabs secured to the arms 100a and 100b, respectively. An opening 110 is defined between the arms 100a and 100b, and also between the angled bottom 95 and the protrusions 105a and 105b. The ramp 15 also includes a cover 115 located near the discharge portion 85 that at least partially covers the arms 100a and 100b. In an exemplary embodiment, the cover 115 at least partially covers the anchor 20 that is accommodated in the discharge portion 85. In an exemplary embodiment, the cover 115 is attached to the walls 90a and 90b. In an exemplary embodiment, the cover 115 is composed of leather, but the cover 115 may be composed any type of flexible material, such as plastic, cloth, etc.

In an exemplary embodiment, the apparatus 10 further includes a proximity switch 120 mounted to the wall 90a of the ramp 15. The proximity switch 120 is located above the ramp 15 and configured to detect a number of anchors 20 that are loaded on the ramp 15. The proximity switch 120 is in communication with the controller 55. In an exemplary embodiment, the proximity switch 120 is mounted anywhere on the ramp 15.

The apparatus 10 further includes a circular table 125 that is configured to rotate about the axis 35. In an exemplary embodiment, the distance between an upper surface 125a of the table 125 and the horizontal surface 50 does not change during rotation of the table 125 about the axis 35. In an exemplary embodiment, the apparatus 10 includes a plurality of the pins 25, which are equidistantly and circumferentially spaced near the perimeter of the circular table 125.

In an exemplary embodiment, the proximity sensor 56 is a sensor that detects the presence or location of the pin 25. The proximity sensor 56 is mounted near the perimeter of the table 125 to detect when the pin 25 moves past the proximity sensor 56. The proximity sensor 56 is in communication with the controller 55. In an exemplary embodiment, the proximity sensor 56 is mounted to a support 130 that is secured to the horizontal surface 50.

In an exemplary embodiment, the depth measurement device 57 is a sensor that measures a distance from the depth measurement device 57 to the anchor 20. In one embodiment, the depth measurement device 57 is located above the table 125. The depth measurement device 57 is in communication with the controller 55. In an exemplary embodiment, the depth measurement device 57 is mounted to the support 130 at a location above the proximity sensor 56.

The movable cam 58 is controlled by the actuator 60 (shown in FIG. 8A) and is generally located below the horizontal surface 50. The movable cam 58 is a wedge-shaped body having two ramps that meet to form a peak. Upon activation of the actuator 60, the movable cam 58 moves into the circular path 45 to create temporary upward and downward ramps within the circular path 45. That is, the movable cam 58 is a wedge configured to selectively change the elevation along the circular path 45. The actuator 60 is in communication with the controller 55.

The fixed cam 70 is a wedge-shaped body having two ramps that meet to form a peak, and is located on the circular path 45 to provide permanent upward and downward ramps within the circular path 45. That is, the fixed cam 70 is a wedge configured to change the elevation along the circular path 45.

Figure 2:
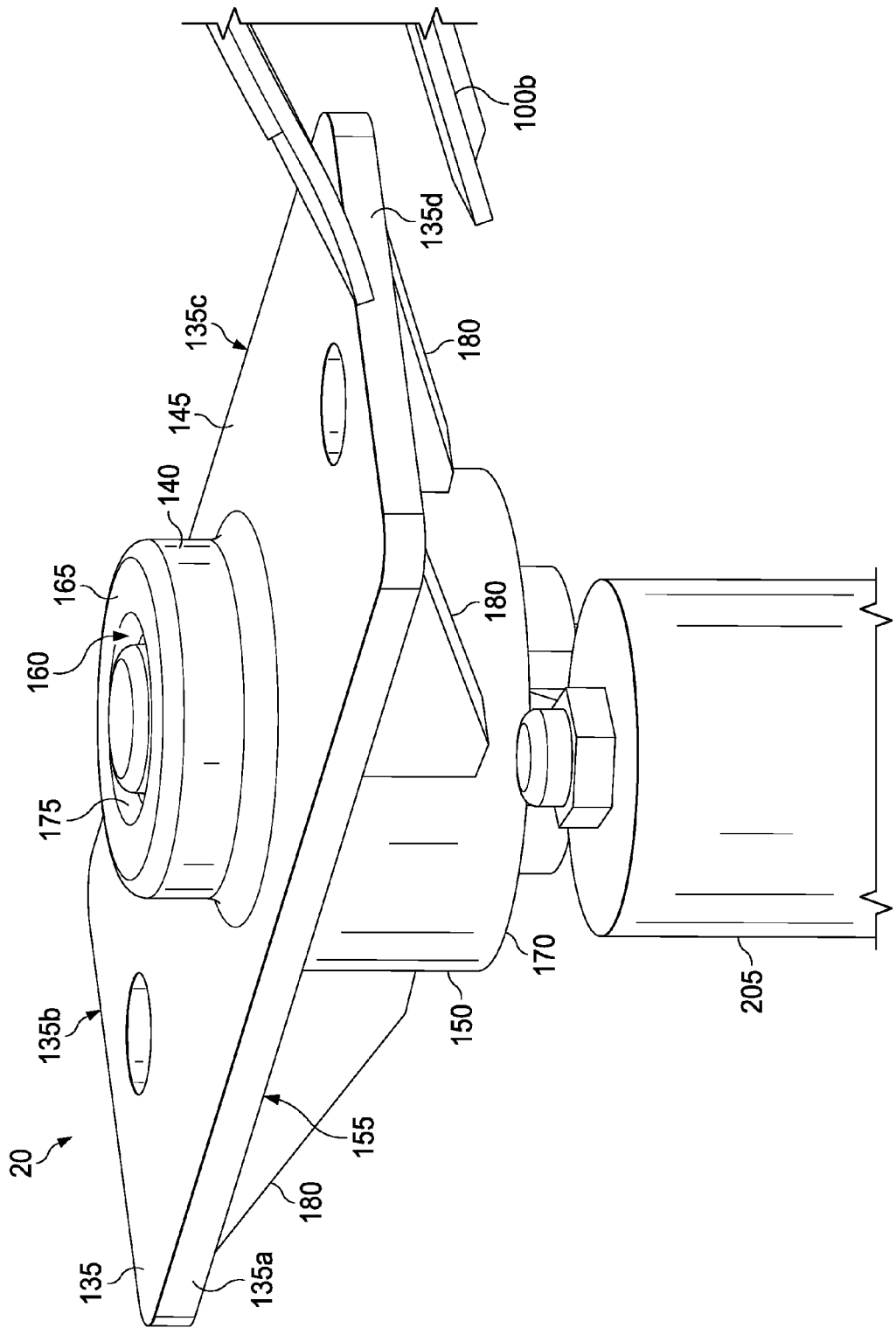
FIG. 2 is a perspective view of one of the piece parts and additional components of the apparatus of FIG. 1.

In an exemplary embodiment, and as illustrated in FIG. 2, the anchor 20 includes a plate 135 having sides 135a, 135b, 135c and 135d. A top tubular portion 140 extends from a top surface 145 of the anchor 20 and a bottom tubular portion 150 extends from a bottom surface 155 of the anchor 20. An opening 160 extends through a top face 165, the top tubular portion 140, the top surface 145, the plate 135, the bottom surface 155, the bottom tubular portion 150, and a bottom face 170. The opening 160 defines an inner surface 175 that has an inner diameter. In an exemplary embodiment, the opening 160 is tapered so that the inner diameter increases as the opening 160 extends from the top face 165 to the bottom face 170. In several exemplary embodiments, the opening 160 defines one or more dimensions such as, for example, a degree of a taper or taper angle, the inner diameter at the top face 165, the inner diameter at the bottom face 170, a plurality of inner diameters defined by the taper, or the length of the opening 160. In an exemplary embodiment, variations to the tapered inner surface 175 can occur. These variations can occur due to the machining, casting, or other manufacturing process used to fabricate the anchor 20. For example, variations to the tapered inner surface 175 can result from, for example, lobing, waviness, or roughness. The anchors 20 having appreciable variations to the tapered inner surface 175 are generally considered unacceptable and should be sorted from the anchors 20 having minor or no variations to the tapered inner surface 175. The anchor 20 also includes gussets 180.

Figure 3:
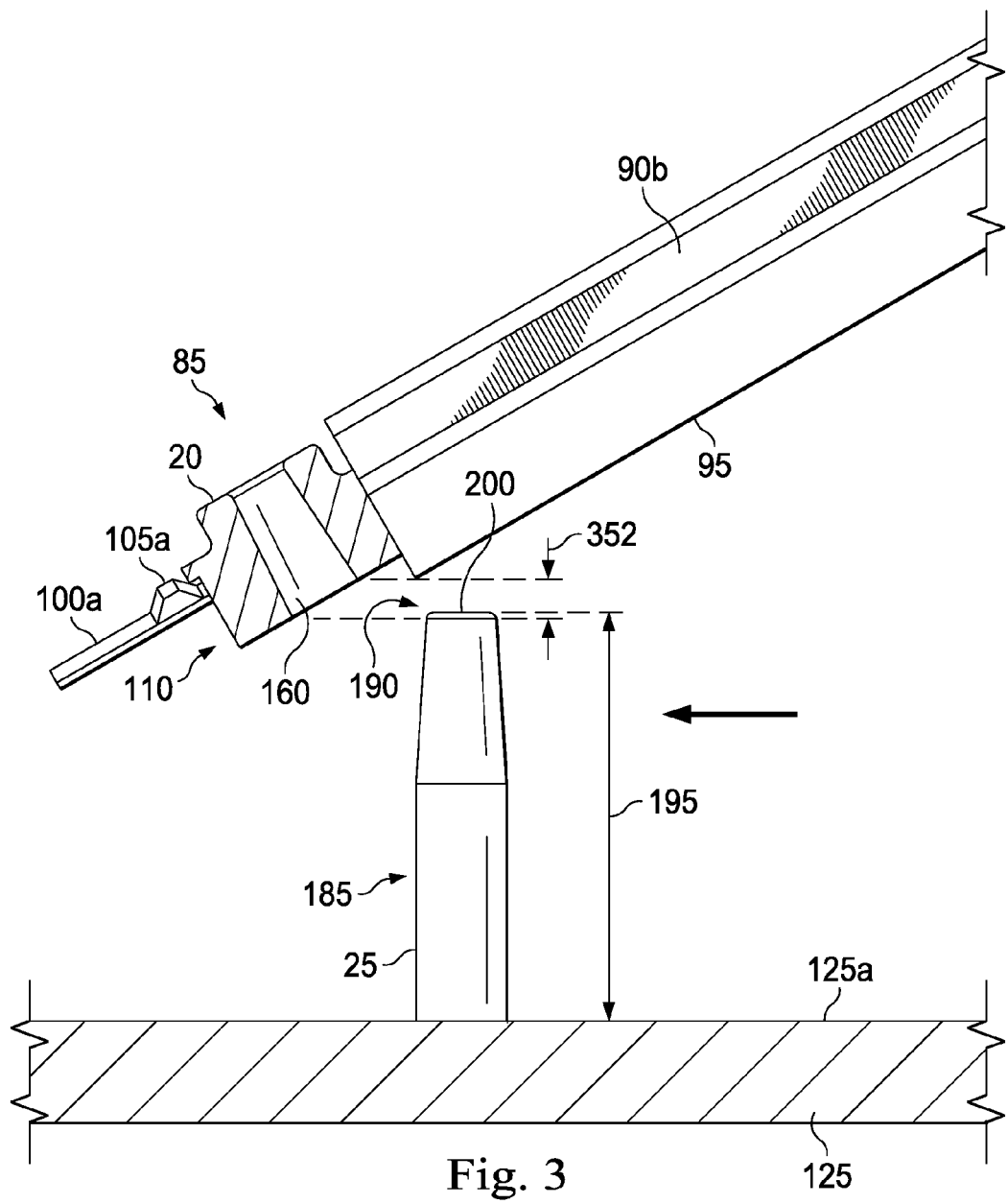
FIG. 3 is a cross sectional view of a portion of the apparatus of FIG. 1, according to an exemplary embodiment.

In an exemplary embodiment and as illustrated in FIG. 3, the pin 25 is tapered from a large diameter at a middle portion 185 to a smaller diameter at a top portion 190. In an exemplary embodiment, the tapering of the pin 25 corresponds to the tapering of the opening 160, allowing the pin 25 to extend within the opening 160 and mate against the inner surface 175. The pin 25 is rigidly coupled to the circular table 125. The pin 25 has a height 195, measured from the upper surface 125a of the circular table 125 to a top 200 of the pin 25. As a result of the pin 25 being rigidly connected to the table 125, the pin 25 moves around the axis 35 along a circular pin rotation path 201 (shown in FIG. 4).

Figure 4:
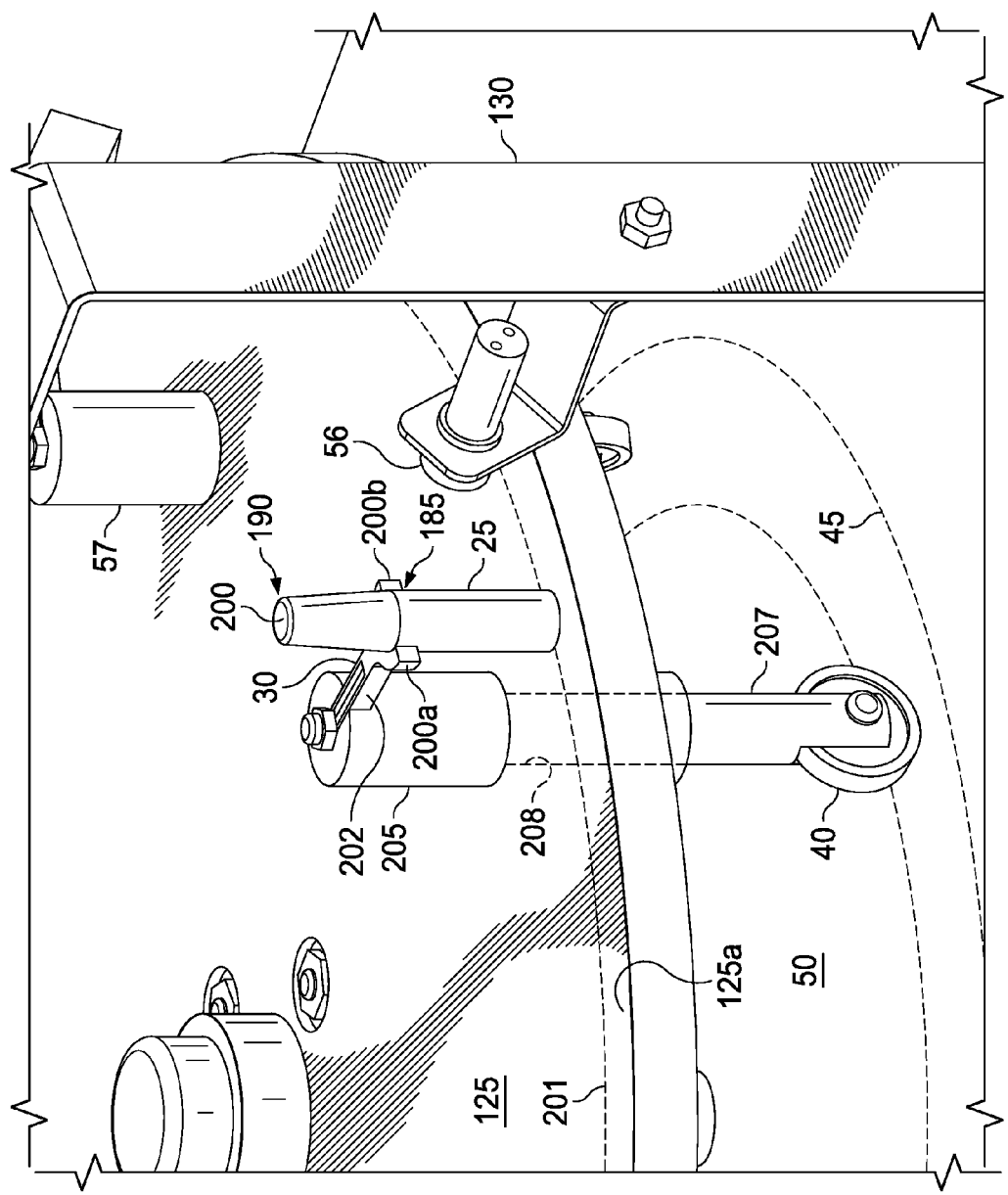
FIG. 4 is a perspective view of another portion of the apparatus of FIG. 1, according to an exemplary embodiment.

In an exemplary embodiment and illustrated in FIG. 4, the bracket 30 is proximate the pin 25 and includes arcuate arms 200a, 200b that extend at least partially around the outer diameter of the pin 25. The arms 200a and 200b are adapted to move, relative to the pin 25, along the longitudinal axis of the pin 25 from the vicinity of the middle portion 185 to the top portion 190. Respective ends of the arms 200a, 200b are joined, forming a u-shaped feature. An arm 202 extends horizontally from the joined ends of the arms 200a, 200b to a block 205. A support 207 extends downward from the block 205. The support 207 extends through an opening 208 formed in the table 125, and is connected to the caster 40. The caster 40 contacts the horizontal surface 50 and is configured to travel in the circular path 45 along the horizontal surface 50. The bracket 30 is configured to move vertically relative to the table 125 in an upwards direction. The block 205 limits vertical movement of the bracket 30 in a downward direction. That is, the caster 40 moves vertically upwards and away from the horizontal surface 50 to push the bracket 30 in the upwards direction, but downward movement by the caster 40 is limited by the block 205 so that the caster 40 does not extend below the horizontal surface 50.

Figure 5:
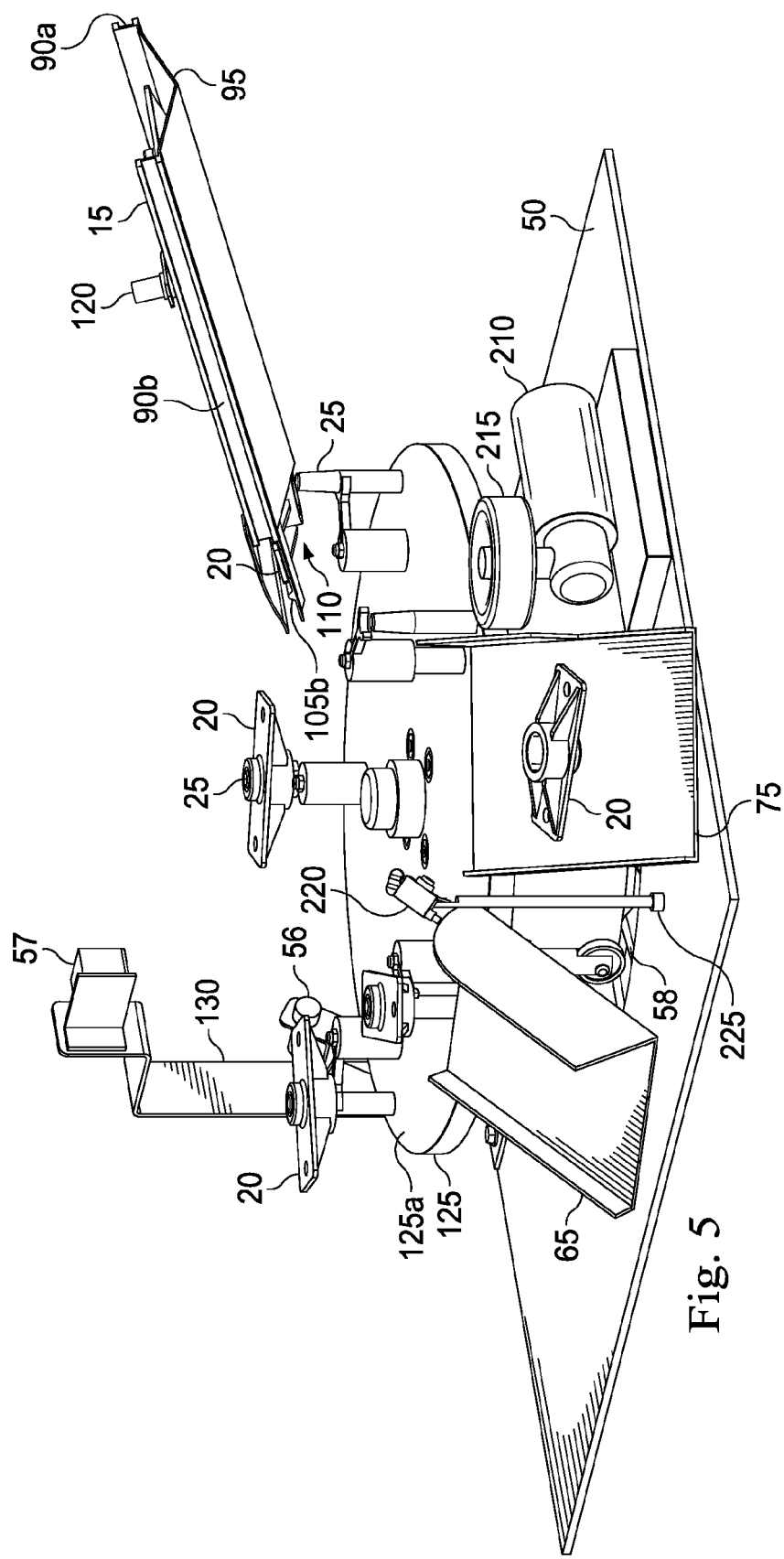
FIG. 5 is another perspective view of the apparatus of FIG. 1, according to an exemplary embodiment.

In an exemplary embodiment and as illustrated in FIG. 5, the apparatus 10 also includes a motor 210 that is operably coupled to a frictional gear 215. Upon operation of the motor 210, the frictional gear 215 rotates. The frictional gear 215 contacts the perimeter of the table 125 to rotate the table 125 upon activation of the motor 210. In an exemplary embodiment, the frictional gear 215 is a tire. In an exemplary embodiment, the motor 210 is in communication with the controller 55.

In an exemplary embodiment, the apparatus 10 also includes a laser counter 220 mounted near the perimeter of the table 125 that detects the presence of the anchor 20 when the anchor 20 enters the chute 75. In an exemplary embodiment, the laser counter 220 is configured to communicate with the controller 55. In an exemplary embodiment, the laser counter 220 is mounted to a support 225.

Figure 6:
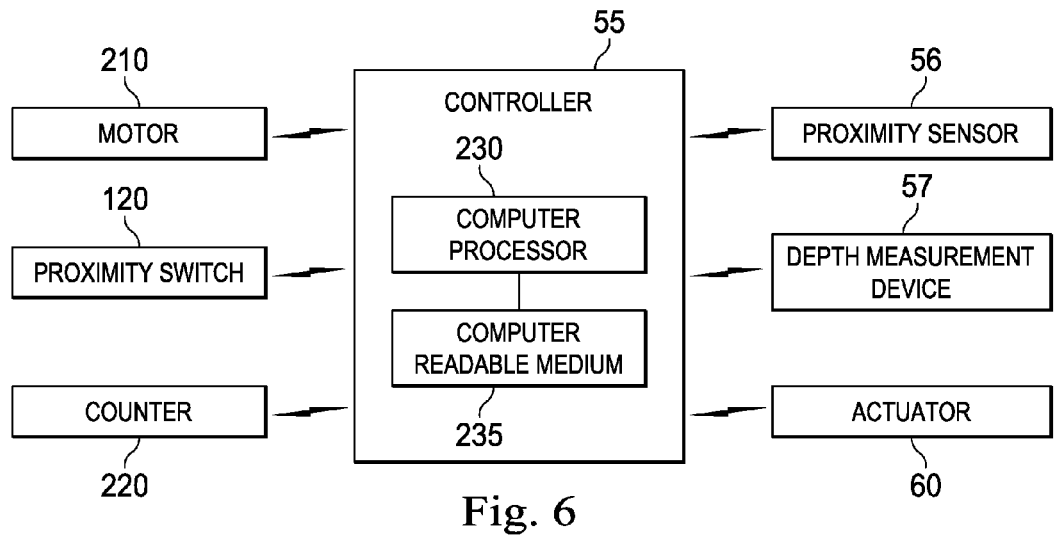
FIG. 6 is a diagrammatic illustration of a control system of the apparatus according to an exemplary embodiment, the system including a proximity sensor, a depth measurement device, an actuator, a controller, a motor, a proximity switch, and a counter.

In an exemplary embodiment and as illustrated in FIG. 6, the controller 55 communicates with the proximity sensor 56, the depth measurement device 57, the actuator 60, the motor 210, the proximity switch 120, and the laser counter 220. The controller 55 controls the proximity sensor 56, the depth measurement device 57, the actuator 60, the motor 210, the proximity switch 120, and the laser counter 220. The controller 55 includes a computer processor 230 and a computer readable medium 235 operably coupled thereto. Instructions accessible to, and executable by, the computer processor 230 are stored on the computer readable medium 235.

Figure 7:
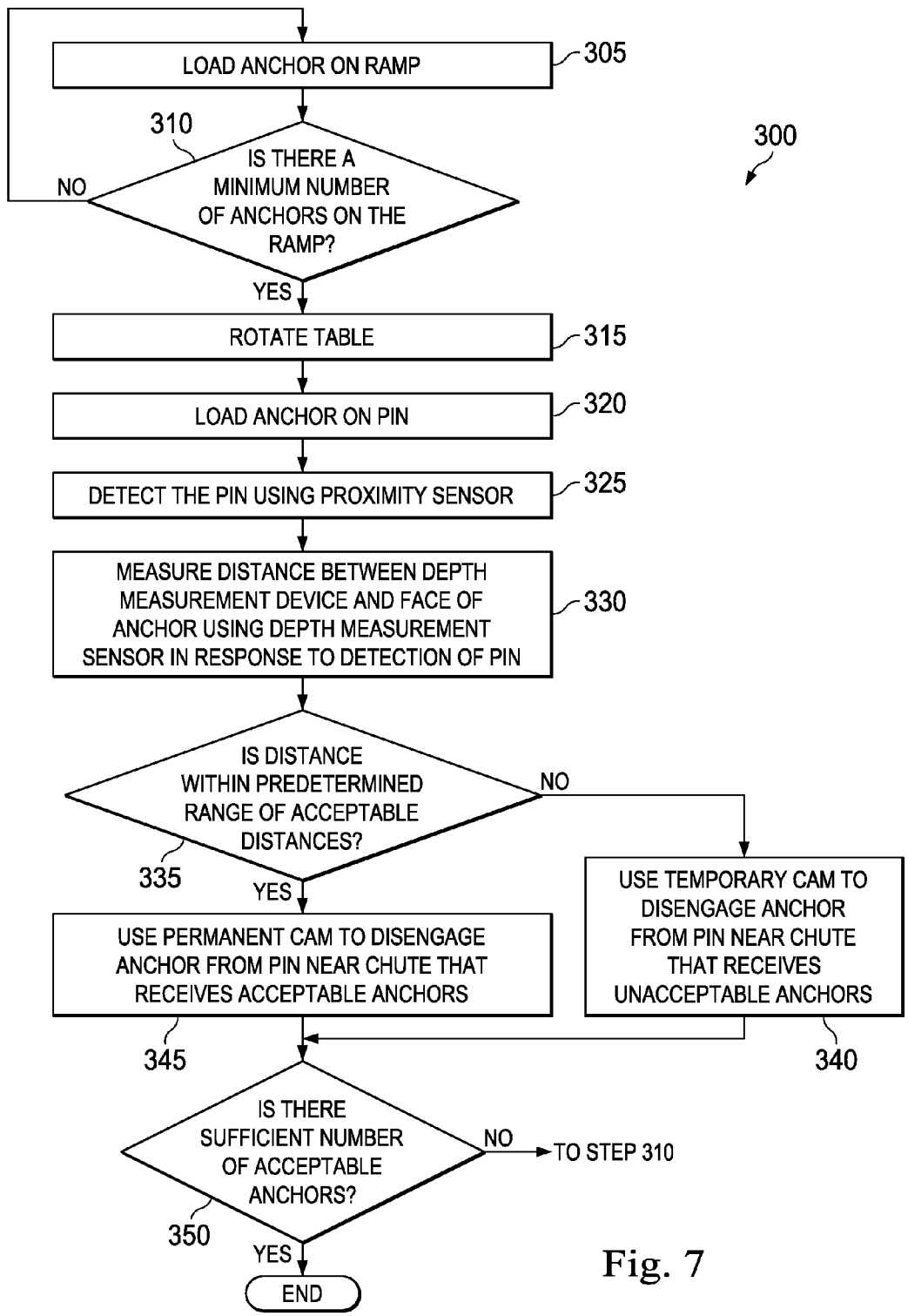
FIG. 7 is a flow chart illustration of a method of operating the apparatus of FIGS. 1-6, according to an exemplary embodiment.

In an exemplary embodiment, as illustrated in FIG. 7 with continuing reference to FIGS. 1-6, a method of operating the apparatus 10 is generally referred to by the reference numeral 300 and includes loading the anchor 20 on the ramp 15 at step 305, determining whether there is a minimum number of anchors 20 on the ramp 15 at step 310, rotating the table 125 at step 315, loading the anchor 20 on the pin 25 at step 320, detecting the pin 25 using the proximity sensor 56 at step 325, measuring the distance between the depth measurement device 57 and the face 165 of the anchor 20 using the depth measurement device 57 in response to the detection of the pin 25 at step 330, determining whether the distance is within a predetermined range of acceptable distances at step 335, using the movable cam 58 to disengage the anchor 20 from the pin 25 near the chute 65 if the distance is not within the predetermined range of acceptable distances at step 340, using the fixed cam 70 to disengage the anchor 20 from the pin 25 near the chute 75 if the distance is within the predetermined range of acceptable distances at step 345, and after either the step 340 or 345, determining if there is a sufficient number of anchors within the chute 75 at step 350.

In an exemplary embodiment and referring back to FIGS. 1 and 3, the anchor 20 is loaded on the ramp 15 at the step 305, the anchor 20 being loaded at the receiving portion 85 and sliding down the ramp 15 to the discharge portion 85. The sides 135b, 135d of the anchor 20 are in contact with or proximate the walls 90a, 90b, respectively. The anchor 20 located in the discharge portion 85 of the ramp 15 is supported by the arms 100a and 100b and rests against the two protrusions 105a and 105b. When the anchor 20 is located in the discharge portion 85 of the ramp 15, the opening 160 is located within the opening 110 of the ramp 15, exposing the opening 160 to the pin rotation path of the pin 25. When the anchor 20 is located in the discharge portion 85 and due to the ramp 15 being mounted at an angle, the opening 160 spans a vertical dimension 352. In an exemplary embodiment, when the anchor 20 is located at the discharge portion 85, the height 195 of the pin 25 is such that the top 200 falls within the vertical dimension 352. The anchor 20 located in the discharge portion 85 is at least partially covered by the cover 115 (not shown in FIG. 3). In an exemplary embodiment, the anchor 20 is accommodated on the ramp 15 at a 45 degree angle measured from the horizontal surface 50. Additional anchors 20 are accommodated on the ramp 15 behind the anchor 20 that is located in the discharge portion 85. In an exemplary embodiment, the anchors 20 are manually loaded, and/or automatically loaded with, for example, a conveyor system.

In an exemplary embodiment, during or after the step 305, the controller 55, using the proximity switch 120, determines whether there is a minimum number of the anchors 20 accommodated on the ramp 15 at the step 310. In an exemplary embodiment, the additional anchors 20 that are accommodated on the ramp 15 behind the anchor 20 that is located at the discharge portion 85 apply a force to the anchor 20 that is located at the discharge portion 85. In an exemplary embodiment, the force aids the loading of the anchor 20 that is located at the discharge portion 85 on to the pin 25. There is a minimum number of the anchors 20 that should be loaded on the ramp 15 to aid in the loading of the anchor 20 that is located at the discharge portion 85 on to the pin 25. The proximity switch 120 is mounted on the ramp 15 so that the proximity switch 120 can detect whether there is the minimum number of anchors 20 loaded on the ramp 15. In an exemplary embodiment, the minimum number of the anchors 20 is five. In another exemplary embodiment, the minimum number of the anchors 20 is six. In an exemplary embodiment, to determine the minimum number of the anchors 20, the proximity switch 120 detects the presence of the fifth anchor 20 loaded on the ramp 15 (assuming that the minimum number of the anchors 20 is five) and such detection is the determination that the minimum number of the anchors 20 are indeed loaded on the ramp 15; in several exemplary embodiments, the minimum number of the anchors 20 may be a number other than five. In an exemplary embodiment, the proximity switch 120 communicates with the controller 55 regarding whether enough of the anchors 20 are loaded on the ramp 15. If there is not the minimum number of anchors 20 on the ramp 15, then the next step is the step 305. If there is the minimum number of anchors 20 on the ramp 15, then the next step is the step 315.

In an exemplary embodiment, during or after the step 310 and if there is the minimum number of anchors 20 on the ramp 15, then the motor 210 rotates the table 125 at the step 315. The controller 55 activates the motor 210, thereby rotating the frictional gear 215 coupled to the motor 210. The rotation of the frictional gear 215 results in rotation of the table 125, as the frictional gear 215 is in frictional contact with the perimeter of the table 125. Rotation of the table 125 causes the caster 40 to move along the path 45 and the pin 25 to move along its pin rotation path.

In an exemplary embodiment, during or after the step 315, the apparatus 10 loads the anchor 20 on the pin 25 at the step 320. To load the anchor 20 on the pin 25, the pin 25 moves in a direction (shown in FIG. 3) towards the anchor 20. Because the height 195 is such that the top 200 of the pin 25 falls within the vertical dimension 352 of the opening 160, the top 200 of the pin 25 enters or extends within the opening 160 of the anchor 20 to engage the anchor 20. Further rotation of the table 125 causes the anchor 20 to lift over the protrusions 105a and 105b. The cover 115 prevents the anchor 20 from disengaging from the pin 25. That is, the cover 115 prevents the anchor 20 from popping off of the pin 25 when the anchor 20 is lifted over the protrusions 105a and 105b. When loaded on the pin 25, the face 165 of the anchor 20 is facing upward, or away from the surface of the table 125a. The anchor 20 rests above the arms 200a and 200b when loaded on the pin 25. In several exemplary embodiments, the location at which the anchor 20 rests along the longitudinal axis of the pin 25 corresponds to whether there is a variation in the tapered inner surface 175. If the tapered inner surface 175 of the opening 160 has no variations, then the anchor 20 will rest on the pin 25 at a predicted nominal location or within a predicted nominal range of locations along the longitudinal axis of the pin 25 (i.e., the pin 25 extends within the opening 160 of the anchor 20 by a nominal distance). If there is a variation to the tapered inner surface 175, such as, for example, a burr is located on the tapered inner surface 175, then the anchor 20 will not rest on the pin 25 at the predicted nominal location or within the predicted nominal range of locations (i.e., the pin 25 extends within the opening 160 of the anchor by a distance that is greater than or less than the predicted nominal distance). Additionally, the location at which the anchor 20 rests along the longitudinal axis of the pin 25 (i.e., the degree of engagement between the anchor 20 and the pin 25) may correspond to whether there is/are variations in one or more dimensions, including the taper angle, the inner diameter at the top face 165, the inner diameter at the bottom face 170, the plurality of inner diameters defined by the taper, or the length of the opening 160.

In an exemplary embodiment, during or after the step 320, the proximity sensor 56 detects the pin 25 at the step 325. In an exemplary embodiment, after the pin 25 engages the anchor 20, both the pin 25 and the anchor 20 continue to move along the pin rotation path. When the pin 25 passes near or past the proximity sensor 56, the proximity sensor 56 detects the pin 25 and communicates this to the controller 55.

In an exemplary embodiment, during or after the step 325, the depth measurement device 57 measures the distance from the depth measurement device 57 to the face 165 of the anchor 20 in response to the detection of the pin 25 at the step 330. After the proximity sensor 56 communicates with the controller 55 regarding the detection of the pin 25, the controller 55 instructs the depth measurement device 57 to measure the distance between the depth measurement device 57 and the face 165 of the anchor 20. In several exemplary embodiments, the distance is a function of, or is based on, the location at which the anchor 20 rests along the longitudinal axis of the pin 25, or the degree of engagement between the anchor 20 and the pin 25. That is, the distance between the depth measurement device 57 and the face 165 of the anchor 20 is a function of, or is based on, whether the pin 25 extends within the opening 160 of the anchor 20 by the predicted nominal distance or by a distance greater than or less than the predicted nominal distance. The depth measurement device 57 then communicates this distance to the controller 55.

In an exemplary embodiment, during or after the step 330, the controller 55 determines whether the distance measured at the step 330 is within the predetermined range of acceptable distances at the step 335. In an exemplary embodiment, the predetermined range of acceptable distances corresponds to the range of predicted nominal locations. Therefore, if the distance is within the predetermined range of acceptable distances, the anchor 20 is resting along the longitudinal axis of the pin 25 within the predicted nominal range of locations because no appreciable variations are present on the tapered inner surface 175 of the opening 160. The predetermined range of acceptable distances can depend on the piece part being measured and the location of the depth measurement device 57, among other things. In an exemplary embodiment, if the distance measured by the depth measurement device 57 falls within the predetermined range of acceptable distances then the anchor 20 is considered acceptable. In an exemplary embodiment, if the distance measured by the depth measurement device 57 falls outside of the predetermined range of acceptable distances, then the anchor 20 is considered unacceptable.

Figure 8A:
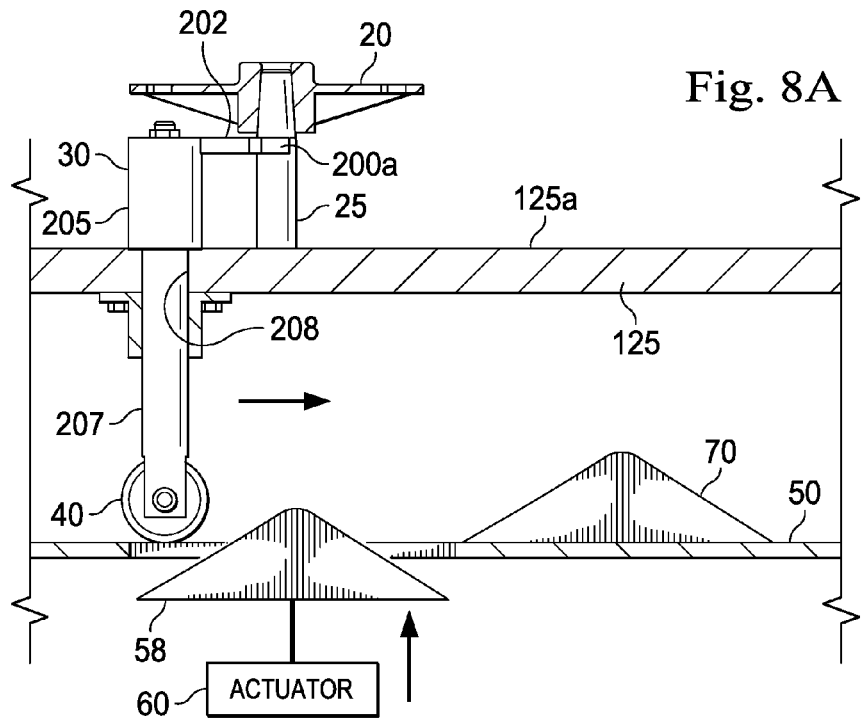
FIGS. 8A-8B are cross sectional views of the movable cam, the fixed cam, the displacement bracket, and the reference component of FIG. 1 during the execution of a step of the method of FIG. 7, according to an exemplary embodiment.
Figure 8B:
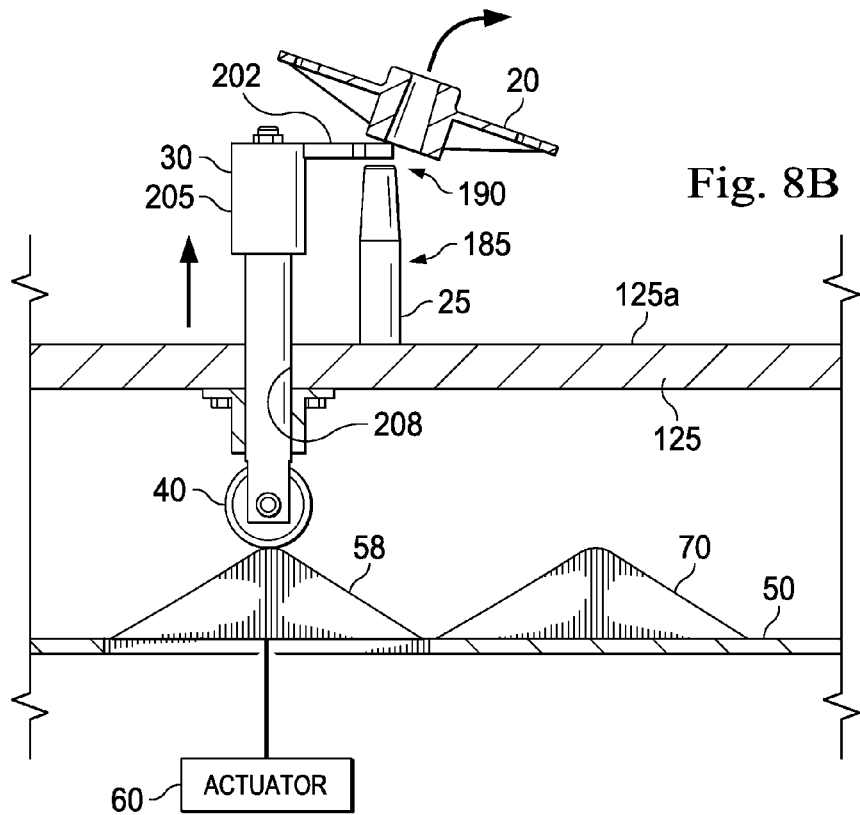

In an exemplary embodiment, after the step 335 and if the distance is not within the predetermined range of acceptable distances, then the anchor 20 is disengaged from the pin 25 near the chute 65 using the movable cam 58 at the step 340. In an exemplary embodiment and as shown in FIGS. 8A and 8B, the movable cam 58 remains below the horizontal surface 50 unless the controller 55 actuates the actuator 60. If the distance measured by the depth measurement device 57 is outside of the predetermined range of acceptable distances, then the controller 55 activates the actuator 60. The actuator 60 displaces the movable cam 58 in an upwards direction towards the circular table 125 and into the path 45, forcing the caster 40 upwards in the vicinity of the chute 65 as the caster 40 passes over the movable cam 58. That is, as the caster 40 moves over the upward ramp of the movable cam 58, the caster 40 and the bracket 30 move in an upwards vertical direction away from the horizontal surface 50. As the bracket 30 moves relative to the table 125 and the pin 25, the arms 200a and 200b slide upwards over the exterior of the pin 25 from the middle portion 185 towards the top portion 190 to lift the anchor 20 up off of the pin 25 at a location near the chute 65, causing the anchor 20 to fall onto, and slide down the chute 65. As the caster 40 moves over the downward ramp of the movable cam 58, the bracket 30 moves vertically downward towards the horizontal surface 50 and the arms 200a and 200b move towards the middle portion 185 of the pin 25. As a result of the anchor 20 being disengaged from the pin 25 at the location near the chute 65, gravity causes the anchor 20 to fall within the chute 65 that receives unacceptable anchors.

Figure 9A:
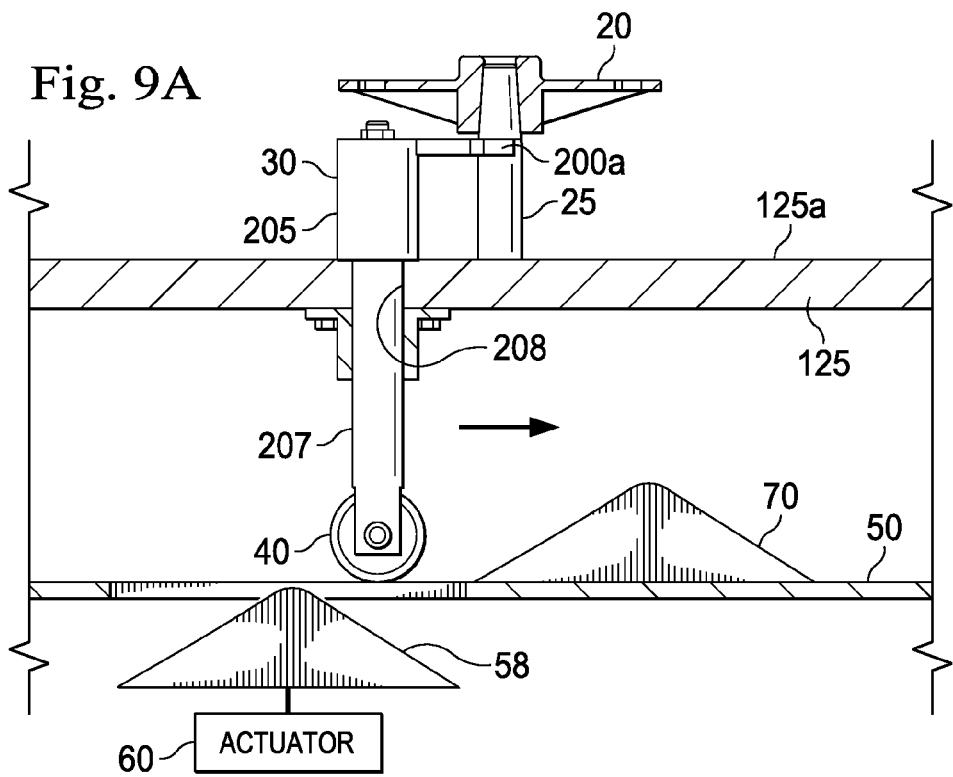
FIGS. 9A-9B are cross sectional views of the movable cam, the fixed cam, the displacement bracket, and the reference component of FIG. 1 during the execution of another step of the method of FIG. 7, according to an exemplary embodiment.
Figure 9B:
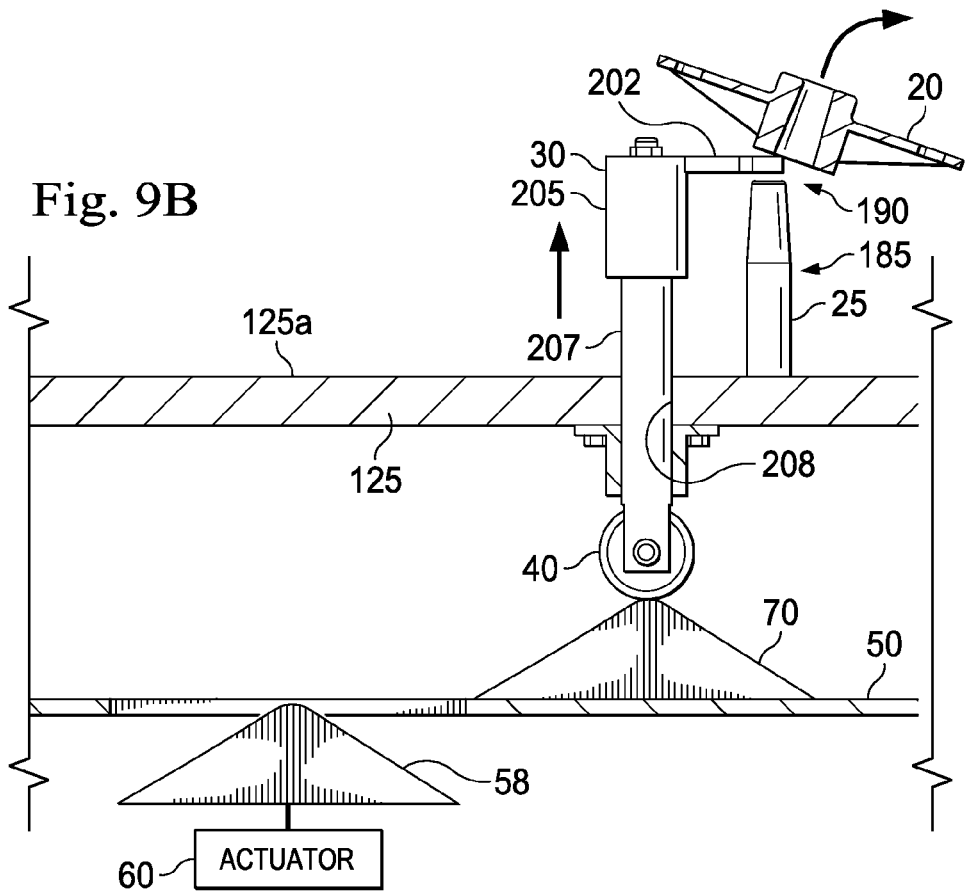

In an exemplary embodiment, after the step 335 and if the distance is within the predetermined range of acceptable distances, then the anchor 20 is disengaged from the pin 25 near the chute 75 using the fixed cam 70 at the step 345. In an exemplary embodiment and as shown in FIGS. 9A and 9B, when the distance is within the predetermined range of acceptable distances, the controller 55 does not activate the actuator 60, and as a result, the caster 40 passes over but does not engage the movable cam 58; thus the caster 40 is not moved in an upwards direction away from the horizontal surface 50 by the movable cam 58 (additionally, the block 205 prevents the caster 40 from dropping towards the movable cam 58). Therefore, the anchor 20 and the pin 25 remain engaged when the bracket 30 begins to move over the upward ramp of the fixed cam 70. When the bracket 30 moves over the fixed cam 70, the caster 40 and bracket 30 move in an upwards direction away from the horizontal surface 50 at a location near the chute 75. That is, as the caster 40 moves over the upward ramp of the fixed cam 70, the caster 40 and corresponding bracket 30 move in an upwards vertical direction away from the horizontal surface 50. As the bracket 30 moves relative to the table 125 and the pin 25, the arms 200a and 200b slide upwards over the exterior of the pin 25 from the middle portion 185 towards the top portion 190 to lift the anchor 20 up off of the pin 25 at the location near the chute 75. That is, the caster 40 moving over the fixed cam 70 disengages the anchor 20 from the pin 25 at the location near the chute 75. As the caster 40 moves over the downward ramp of the fixed cam 70, the bracket 30 moves vertically downward towards the horizontal surface 50 and the arms 200a and 200b move towards the middle portion 185 of the pin 25. As a result of the anchor 20 being disengaged from the pin 25 at the location near the chute 75, gravity causes the anchor 20 to fall within the chute 75 that receives acceptable anchors.

In an exemplary embodiment, before, during or after the step 345, the controller 55 determines whether there is a sufficient number of the anchors 20 that have slid down the chute 75 at the step 350; that is, the controller 55 detects whether there is a sufficient number of the acceptable anchors 20. In an exemplary embodiment, the laser counter 220 communicates with the controller 55 regarding the entrance of each of the anchors 20 to the chute 75 that receives the acceptable anchors 20. The laser counter 220 and/or the controller 55 count the number of anchors 20 that fall within the chute 75. If the controller 55 determines that there is a sufficient number of the anchors 20 that have passed through the chute 75, then the method 300 ends. If the controller 55 determines that there is not a sufficient number of the anchors 20 that have passed through the chute 75, then the next step is the step 310 to continue the method 300.

As a result of the operation of the above-described apparatus 10, the anchors 20 can be quickly and easily sorted based on one or more dimensions of the opening 160, such as the varying inner diameter of the opening 160. That is, the apparatus 10 automatically sorts the anchors 20 into either the chute 65 or the chute 75 based on whether there is/are variations in one or more dimensions such as, for example, the degree of a taper, the inner diameter at the top face 165, the inner diameter at the bottom face 170, the plurality of inner diameters defined by the taper, or the length of the opening 160.

In another embodiment, the proximity sensor 56, the depth measurement device 57, the proximity switch 120, and the laser counter 220 are any type of light sensor. In another embodiment, the proximity sensor 56, the depth measurement device 57, the proximity switch 120, and the laser counter 220 are any type of sensor that detects the presence of an object at a specific location. In an exemplary embodiment, one or more of the proximity sensor 56, the depth measurement device 57, the proximity switch 120, and the laser counter 220 is an analog sensor. In an exemplary embodiment, one or more of the proximity sensor 56, the depth measurement device 57, the proximity switch 120, and the laser counter 220 is an ultrasonic sensor that includes an analog output.

In an exemplary embodiment, instead of a post-tension concrete anchor, the piece part can be any part having an inner diameter, varying or otherwise. In an exemplary embodiment, instead of a post-tension concrete anchor, the piece part can be any part having an opening.

In an exemplary embodiment, instead of the proximity sensor 56 detecting the pin 25 at the step 325, the proximity sensor 56 detects the anchor 20 that is loaded on the pin 25 at the step 325.

In another exemplary embodiment, the ramp 15 is mounted at an angle about between 0 degrees and 90 degrees relative to the ground or the horizontal surface 50. In another exemplary embodiment, the ramp 15 is mounted at an angle between about 10 degrees and 80 degrees relative to the ground or the horizontal surface 50. In another exemplary embodiment, the ramp 15 is mounted at an angle between about 20 degrees and 70 degrees relative to the ground or the horizontal surface 50. In another exemplary embodiment, the ramp 15 is mounted at an angle between about 30 degrees and 60 degrees relative to the ground or the horizontal surface 50. In another exemplary embodiment, the ramp 15 is mounted at an angle between about 40 degrees and 50 degrees relative to the ground or the horizontal surface 50. In another exemplary embodiment, the ramp 15 is mounted at an angle relative to the ground or the horizontal surface 50 determined upon the dimensions of the piece part.

In another exemplary embodiment, the minimum number of anchors 20 loaded on the ramp 15 is between 1 and 10. In an exemplary embodiment, the minimum number of anchors 20 is between 2 and 9. In an exemplary embodiment, the minimum number of anchors 20 is between 3 and 8. In an exemplary embodiment, the minimum number of piece parts loaded on the ramp 15 depends upon the weight of the piece parts loaded on the ramp 15.

In another exemplary embodiment, the arms 100*a* and 100*b* extend from the angled bottom 95.

Figure 10:
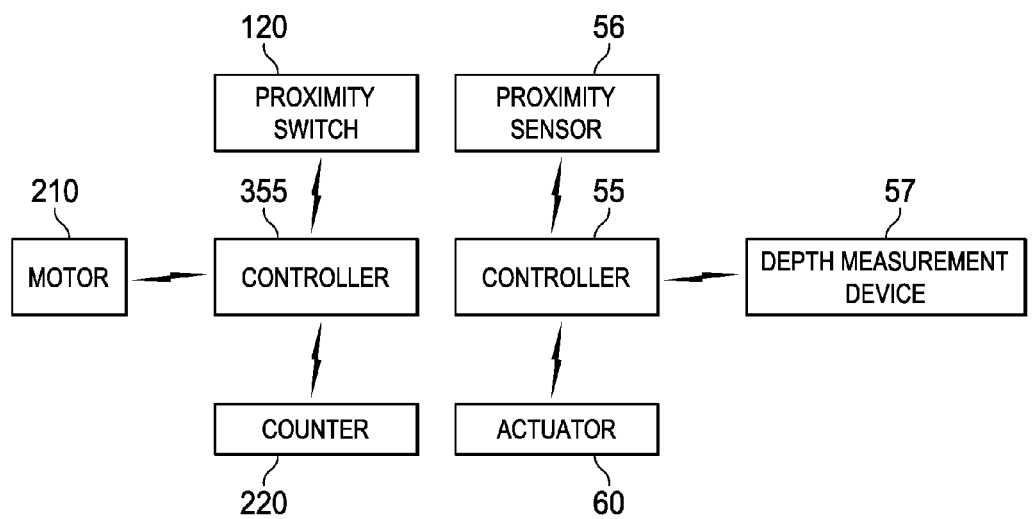
FIG. 10 is diagrammatic illustration of an alternate control system of the apparatus according to an exemplary embodiment, the system including the proximity sensor, the depth measurement device, the actuator, the controller, the motor, the proximity switch, and the counter of FIG. 6, and another controller.

In another exemplary embodiment, and as shown in FIG. 10, the motor 210 includes, or is in communication with, a controller 355, which communicates with the proximity switch 120 and the counter 220. In contrast to the embodiment illustrated in FIG. 6, the controller 55 does not communicate with the motor 210, the proximity switch 120, or the counter 220. Instead, the controller 55 only communicates with and/or controls the proximity sensor 56, the depth measurement device 57, and the actuator 60. In several exemplary embodiments, the controller 55 includes a plurality of controllers. In several exemplary embodiments, the controller 355 includes a plurality of controllers.

In another exemplary embodiment, the controller 55 and/or 355 can communicate with any one of the motor 210, the proximity switch 120, the counter 220, the proximity sensor 56, the depth measurement device 57, and the actuator 60 via a network. In several exemplary embodiments, the network includes the Internet, any type of local area network, any type of wide area network, any type of wireless network and/or any combination thereof.

In several exemplary embodiments, the chute 65 conveys the unacceptable anchors 20 to a location designated to receive the unacceptable anchors 20 such as, for example, a box, a container, a crate, a conveyor, or a portion of a floor designated to receive unacceptable anchors 20. However, in several embodiments, the chute 65 is omitted from the apparatus 10 and the unacceptable anchors 20 are disengaged near the location designated to receive the unacceptable anchors 20 such as, for example, the box, the container, the crate, the conveyor, or the portion of the floor designated to receive unacceptable anchors 20, so that the unacceptable anchors 20 fall directly into or onto the box, the container, the crate, the conveyor, or the portion of the floor designated to receive unacceptable anchors 20, respectively, after being disengaged from the pin 25. In several exemplary embodiments, the conveyor automatically conveys the unacceptable anchors 20 to an inspection area for additional inspection of the dimension of the opening 160 or for inspection of a dimension other than the dimension of the opening 160.

In several exemplary embodiments, the chute 75 conveys the acceptable anchors 20 to a location designated to receive the acceptable anchors 20 such as, for example, a box, a container, a crate, a conveyor, or a portion of a floor designated to receive acceptable anchors 20. However, in several embodiments, the chute 75 is omitted from the apparatus 10 and the acceptable anchors 20 are disengaged near the location designated to receive the acceptable anchors 20 such as, for example, the box, the container, the crate, the conveyor, or the portion of the floor designated to receive acceptable anchors 20, so that the acceptable anchors 20 fall directly into or onto the box, the container, the crate, the conveyor, or the portion of the floor designated to receive acceptable anchors 20, respectively, after being disengaged from the pin 25. In several exemplary embodiments, the conveyor automatically conveys the acceptable anchors 20 to the inspection area for inspection of another dimension of the opening 160 or for inspection of a dimension other than the dimension of the opening 160.

In an exemplary embodiment, the movable cam 58 and the fixed cam 70 are omitted from the apparatus 10. Instead, the apparatus 10 includes any one of a variety of anchor removal mechanisms such as, for example, pick and place equipment that lifts the anchor 20 from the pin 25 to disengage the anchor 20 from the pin 25. Additionally, in an exemplary embodiment, the bracket 30 is not coupled to the table 125 and can be located at any one of a variety of locations within the apparatus 10. For example, in an exemplary embodiment, the bracket 30 or another bracket is coupled to the pick and place equipment. In an exemplary embodiment, the apparatus 10 includes a robotic arm that, using the bracket 30 or another bracket, removes the anchor 20 from the pin 25. In an exemplary embodiment, the apparatus 10 includes the pick and place equipment, which includes a robotic arm that removes the acceptable anchors 20 from the pins 25 and another robotic arm that removes the unacceptable anchors 20 from the pins 25. In an exemplary embodiment, the robotic arm that removes the acceptable anchors 20 places or releases the acceptable anchors 20 into or onto the location designated to receive the acceptable anchors 20 such as, for example, the box, the container, the crate, the conveyor, or the portion of the floor designated to receive acceptable anchors 20. In an exemplary embodiment, the another robotic arm that removes the unacceptable anchors from the pins 25 places or releases the unacceptable anchors 20 into or onto the location designated to receive the unacceptable anchors 20 such as, for example, the box, the container, the crate, the conveyor, or the portion of the floor designated to receive unacceptable anchors 20.

Figure 11:
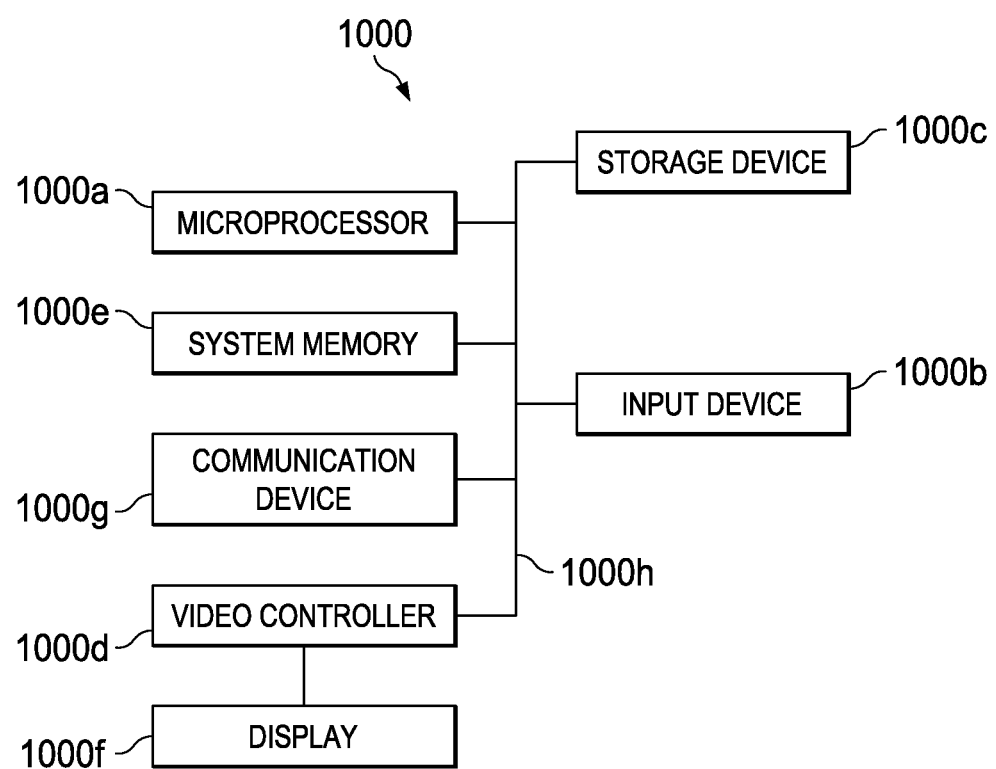
FIG. 11 is a diagrammatic illustration of a node for implementing one or more exemplary embodiments of the present disclosure, according to an exemplary embodiment.

In an exemplary embodiment, as illustrated in FIG. 11 with continuing reference to FIGS. 1-7, 8A, 8B, 9A, 9B, and 10, an illustrative node 1000 for implementing one or more embodiments of one or more of the above-described networks, elements, methods and/or steps, and/or any combination thereof, is depicted. The node 1000 includes a microprocessor 1000*a*, an input device 1000*b*, a storage device 1000*c*, a video controller 1000*d*, a system memory 1000*e*, a display 1000*f*, and a communication device 1000*g* all interconnected by one or more buses 1000*h*. In several exemplary embodiments, the storage device 1000*c* may include a floppy drive, hard drive, CD-ROM, optical drive, any other form of storage device and/or any combination thereof. In several exemplary embodiments, the storage device 1000*c* may include, and/or be capable of receiving, a floppy disk, CD-ROM, DVD- ROM, or any other form of computer-readable medium that may contain executable instructions. In several exemplary embodiments, the communication device 1000g may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, and cell phones.

In several exemplary embodiments, one or more of the motor 210, the proximity switch 120, the counter 220, the proximity sensor 56, the depth measurement device 57, the actuator 60, any other of the above-described sensors, and/or any of the above-described motors is, or at least includes the node 1000 and/or components thereof, and/or one or more nodes that are substantially similar to the node 1000 and/or components thereof.

In several exemplary embodiments, a computer system typically includes at least hardware capable of executing machine readable instructions, as well as the software for executing acts (typically machine-readable instructions) that produce a desired result. In several exemplary embodiments, the computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of the computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code. In several exemplary embodiments, data signals could be carried across transmission mediums and store and transport various data structures, and, thus, may be used to transport an embodiment of the present disclosure.

In several exemplary embodiments, the network, and/or one or more portions thereof, may be designed to work on any specific architecture. In an exemplary embodiment, one or more portions of the network may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In an exemplary embodiment, the computer readable medium 235 includes a plurality of instructions stored thereon, the instructions being executable by at least the computer processor 230 to execute and control the above-described operation of the apparatus 10. In an exemplary embodiment, the computer readable medium 235 includes a plurality of instructions stored thereon, the instructions being executable by at least the computer processor 230 to execute the method 300.

In several exemplary embodiments, while different steps, processes, and procedures are described as appearing as distinct acts, one or more of the steps, one or more of the processes, and/or one or more of the procedures could also be performed in different orders, simultaneously and/or sequentially. In several exemplary embodiments, the steps, processes and/or procedures could be merged into one or more steps, processes and/or procedures.

An apparatus for inspecting and sorting a piece part based on at least one dimension defined by an opening formed in the piece part has been described, the apparatus including a reference component configured to engage the piece part by extending within the opening of the piece part by a first distance, the first distance being based on the at least one dimension; a bracket configured to disengage the piece part from the reference component; a depth measurement device configured to measure a second distance, the second distance a function of the first distance; and a controller in communication with the depth measurement device, the controller configured to determine whether the second distance is within a predetermined range of distances; wherein, if the second distance is not within the predetermined range of distances, the bracket disengages the piece part from the reference component at a first location; and wherein, if the second distance is within the predetermined range of distances, the bracket disengages the piece part from the reference component at a second location, the second location being different from the first location. In several exemplary embodiments, the apparatus also includes a table to which the reference component and the bracket are coupled, the table configured to move the reference component about an axis along a first circular path and to move the bracket about the axis along a second circular path; and a ramp having a discharge portion configured to accommodate the piece part at an angle relative to the table so that the opening of the piece part is exposed to the table and located along the first circular path; wherein upon rotation of the table, the reference component moves along the first circular path and engages the piece part to remove the piece part from the discharge portion of the ramp; wherein upon further rotation of the table, the bracket disengages the piece part from the reference component. In several exemplary embodiments, the apparatus further includes a movable cam configured to be temporarily located along the second circular path at the first location, the movable cam configured to cause the bracket to disengage the piece part from the reference component at the first location; and a fixed cam permanently located along the second circular path at the second location and configured to cause the bracket to disengage the piece part from the reference component at the second location. In yet another embodiment, the apparatus also includes an actuator operably coupled to the movable cam and in communication with the controller; wherein the actuator displaces the movable cam to temporarily locate the movable cam along the second circular path; and wherein the controller causes the actuator to displace the movable cam to temporarily locate the movable cam along the second circular path. In an exemplary embodiment, the apparatus includes a proximity switch configured to detect whether there is a minimum number of anchors accommodated on the ramp. In another exemplary embodiment, the apparatus also includes a proximity sensor configured to detect the location of the reference component, wherein the depth measurement device is configured to measure the second distance in response to the proximity sensor detecting the location of the reference component. In another exemplary embodiment, the reference component is a pin and the piece part is a post-tension concrete anchor. In yet another exemplary embodiment, the bracket is configured to move relative to the reference component to disengage the piece part from the reference component.

A method of inspecting and sorting a piece part based on at least one dimension defined by an opening formed in the piece part has been described, the method including extending a reference component within the opening of the piece part by a first distance, the first distance being based on the at least one dimension; measuring a second distance using a depth measurement device, the second distance a function of the first distance; determining, using a controller in communication with the depth measurement device, whether the second distance is within a predetermined range of distances; disengaging the piece part from the reference component, using a bracket that is proximate the reference component, at a first location if the second distance is not within the predetermined range of distances; and disengaging the piece part from the reference component, using the bracket, at a second location if the second distance is within the predetermined range of distances, the second location being different than the first location. In an exemplary embodiment, the method also includes rotating a table to which the reference component and the bracket are coupled, the table configured to move the reference component about an axis along a first circular path and to move the bracket about the axis along a second circular path; wherein disengaging the piece part from the reference component, using a bracket that is proximate the reference component, at a first location includes: temporarily locating a movable cam along the second circular path; and moving the bracket along the second circular path so that the bracket moves over the movable cam to cause the bracket to move in the upwards direction relative to the reference component; and wherein disengaging the piece part from the reference component, using the bracket, at a second location includes: locating a fixed cam along the second circular path; and moving the bracket along the second circular path so that the bracket moves over the fixed cam to cause the bracket to move in the upwards direction relative to the reference component. In an exemplary embodiment, the method further includes an actuator operably coupled to the movable cam and in communication with the controller; wherein the actuator displaces the movable cam to temporarily locate the movable cam along the second circular path; and wherein the controller causes the actuator to displace the movable cam to temporarily locate the movable cam along the second circular path. In an exemplary embodiment, the method includes accommodating the piece part on a ramp that has a discharge portion configured to accommodate the piece part at an angle relative to the table so that the opening of the piece part is exposed to the table and located along the circular path; and rotating the table so that the reference component moves along the circular path and engages the piece part to remove the piece part from the discharge portion of the ramp. In yet another exemplary embodiment, the method also includes detecting the location of the reference component using a proximity sensor, wherein measuring the second distance using a depth measurement device is in response to the proximity sensor detecting the location of the reference component. In an exemplary embodiment, the method also includes disengaging the piece part from the reference component includes moving the bracket in an upwards direction relative to the reference component. In several exemplary embodiments, the reference component is a pin and the piece part is a post-tension concrete anchor.

A method of inspecting at least one dimension of a piece part has been described, the method including engaging the piece part with a reference component, wherein the degree of engagement between the piece part and the reference component is dependent upon the at least one dimension of the piece part; automatically measuring, using a controller, a distance, wherein the distance is dependent upon the engagement between the piece part and the reference component; automatically determining, using the controller, whether the distance is within a predetermined range of distances; automatically conveying, using the controller, the piece part to a first location if the distance is not within the predetermined range of distances; and automatically conveying, using the controller, the piece part to a second location if the distance is within the predetermined range of distances, wherein the second location is different from the first location. In another exemplary embodiment, the reference component is automatically engaged with the piece part. In yet another exemplary embodiment, engaging the reference component with the piece part includes: moving the reference component relative to the piece part so that the piece part, in response to the relative movement, automatically engages the reference component. In another exemplary embodiment, automatically measuring the distance includes: automatically measuring, using a depth measurement device, a depth between the depth measurement device and the piece part, wherein the depth equals the distance. In several exemplary embodiments, automatically measuring the distance includes: automatically detecting, using a proximity sensor, a position of the reference component; wherein the distance is automatically measured in response to the detection of the position of the reference component. In another exemplary embodiment, automatically conveying the piece part to the first location includes: automatically disengaging the piece part from the reference component at a third location, relative to the first location, so that gravity causes the piece part to move to the first location. In another exemplary embodiment, automatically conveying the piece part to a second location includes: automatically disengaging the piece part from the reference component at a fourth location, relative to the second location, so that gravity causes the piece part to move to the second location; wherein the fourth location is different from the third location. In yet another exemplary embodiment, the one dimension is an inner diameter of an opening. In several exemplary embodiments, the predetermined range of distances corresponds to an acceptable tolerance limit of the inner diameter. In another exemplary embodiment, the piece part is a post-tension concrete anchor and the reference component is a pin.

An apparatus for inspecting at least one dimension of a piece part has been described, the apparatus including a reference component configured to engage the piece part, wherein the degree of engagement between the piece part and the reference component is dependent upon the at least one dimension of the piece part; a means for automatically measuring a distance to the piece part, wherein the distance is dependent upon the engagement between the piece part and the reference component; a means for automatically determining whether the distance is within a predetermined range of distances; a means for automatically conveying the piece part to a first location if the distance is not within the predetermined range of distances and automatically conveying the piece part to a second location if the distance is within the predetermined range of distances, wherein the second location is different from the first location. In another exemplary embodiment, the reference component is configured to automatically engage the piece part. In another exemplary embodiment, the piece part is a post-tension concrete anchor and the reference component is a pin.

An apparatus for inspecting and sorting a piece part based on at least one dimension of an opening formed in the piece part has been described, the apparatus including a reference component configured to be extended within the opening of the piece part by a first distance, the first distance corresponding to the at least one dimension of the opening; a means for detecting the location of the reference component; a means for measuring a second distance upon the detection of the location of the reference component, the second distance a function of the first distance; a means for determining whether the second distance is within a predetermined range of distances; a displacement bracket that is configured to disengage the piece part from the reference component at a first location if the second distance is not within the predetermined range of distances and to disengage the piece part from the reference component at a second location if the second distance is within the predetermined range of distances, the second location being different than the first location. In an exemplary embodiment, the apparatus includes a table to which the reference component and the displacement bracket are coupled, the table configured to move the reference component about an axis along a first circular path and to move the displacement bracket about the axis along a second circular path; and a ramp having a discharge portion configured to accommodate the piece part at an angle relative to the table so that the opening of the piece part is exposed to the table and located along the first circular path; wherein upon rotation of the table, the reference component moves along the first circular path to engage the piece part and to remove the piece part from the discharge portion of the ramp; wherein upon further rotation of the table, the displacement bracket is configured to disengage the piece part from the reference component.

It is understood that variations may be made in the foregoing without departing from the scope of the disclosure.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "left," "right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures. In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. An apparatus for inspecting and sorting a piece part based on at least one dimension defined by an opening formed in the piece part, the apparatus comprising:
   a reference component configured to engage the piece part by extending within the opening of the piece part by a first distance, the first distance being based on the at least one dimension;
   a bracket to disengage the piece part from the reference component;
   a depth measurement device configured to measure a second distance, the second distance being a function of the first distance; and a controller in communication with the depth measurement device, the controller configured to determine whether the second distance is within a predetermined range of distances;

wherein, if the second distance is not within the predetermined range of distances, the bracket disengages the piece part from the reference component at a first location; and wherein, if the second distance is within the predetermined range of distances, the bracket disengages the piece part from the reference component at a second location, the second location being different from the first location.

2. The apparatus of claim 1, further comprising a table to which the reference component and the bracket are coupled, the table configured to rotate to move the reference component about an axis along a circular path.

3. The apparatus of claim 2, further comprising:
a ramp having a discharge portion configured to accommodate the piece part at an angle relative to the table so that the opening of the piece part is exposed to the table and located along the circular path;
wherein upon rotation of the table, the reference component moves along the circular path and engages the piece part to remove the piece part from the discharge portion of the ramp.

4. The apparatus of claim 3, further comprising a proximity switch configured to detect whether there is a minimum number of anchors accommodated on the ramp.

5. The apparatus of claim 1, further comprising a proximity sensor configured to detect the reference component, wherein the depth measurement device is configured to measure the second distance in response to the proximity sensor detecting the reference component.

6. The apparatus of claim 1, wherein the reference component is a pin and the piece part is a post-tension concrete anchor.

7. The apparatus of claim 1, wherein the bracket is configured to move relative to the reference component to disengage the piece part from the reference component.

8. A method of inspecting and sorting a piece part based on at least one dimension defined by an opening formed in the piece part, the method comprising:
extending a reference component within the opening of the piece part by a first distance, the first distance being based on the at least one dimension;
measuring a second distance using a depth measurement device, the second distance being a function of the first distance;
determining, using a controller in communication with the depth measurement device, whether the second distance is within a predetermined range of distances;
disengaging the piece part from the reference component at a first location if the second distance is not within the predetermined range of distances; and
disengaging the piece part from the reference component at a second location if the second distance is within the predetermined range of distances, the second location being different than the first location.

9. The method of claim 8, further comprising rotating a table to which the reference component is coupled, the table configured to move the reference component about an axis along a circular path.

10. The method of claim 9, further comprising:
accommodating the piece part on a ramp that has a discharge portion configured to accommodate the piece part at an angle relative to the table so that the opening of the piece part is exposed to the table and located along the circular path; and
rotating the table so that the reference component moves along the circular path and engages the piece part to remove the piece part from the discharge portion of the ramp.

11. The method of claim 8, further comprising detecting the reference component using a proximity sensor, wherein the depth measurement device measures the second distance in response to the detection of the reference component by the proximity sensor.

12. The method of claim 8, wherein disengaging the piece part from the reference component comprises moving a bracket relative to the reference component.

13. The method of claim 8, wherein the reference component is a pin and the piece part is a post-tension concrete anchor.

14. A method of inspecting at least one dimension of a piece part, the method comprising:
engaging the piece part with a reference component, wherein the degree of engagement between the piece part and the reference component is dependent upon the at least one dimension of the piece part;
automatically measuring, using a controller, a distance, wherein the distance is dependent upon the engagement between the piece part and the reference component;
automatically determining, using the controller, whether the distance is within a predetermined range of distances;
automatically conveying, using the controller, the piece part to a first location if the distance is not within the predetermined range of distances; and
automatically conveying, using the controller, the piece part to a second location if the distance is within the predetermined range of distances, wherein the second location is different from the first location.

15. The method of claim 14, wherein the reference component is automatically engaged with the piece part.

16. The method of claim 15, wherein engaging the reference component with the piece part comprises:
moving the reference component relative to the piece part so that the piece part, in response to the relative movement, automatically engages the reference component.

17. The method of claim 14, wherein automatically measuring the distance comprises:
automatically measuring, using a depth measurement device, a depth between the depth measurement device and the piece part, wherein the depth equals the distance.

18. The method of claim 14, wherein automatically measuring the distance comprises:
automatically detecting, using a proximity sensor, a position of the reference component;
wherein the distance is automatically measured in response to the detection of the position of the reference component.

19. The method of claim 14, wherein automatically conveying the piece part to the first location comprises:
automatically disengaging the piece part from the reference component at a third location, proximate the first location, so that gravity causes the piece part to move to the first location.

20. The method of claim 19, wherein automatically conveying the piece part to a second location comprises:
automatically disengaging the piece part from the reference component at a fourth location, proximate the second location, so that gravity causes the piece part to move to the second location;
wherein the fourth location is different from the third location.

21. The method of claim 14, wherein the piece part is a post-tension concrete anchor and the reference component is a pin.

* * * * *